United States Patent
Moreno et al.

(10) Patent No.: US 10,826,775 B1
(45) Date of Patent: Nov. 3, 2020

(54) POLICY PLANE INTEGRATION ACROSS MULTIPLE DOMAINS

(71) Applicant: Cisco Technology, Inc., San Jose, CA (US)

(72) Inventors: Victor Moreno, Carlsbad, CA (US); Anand Oswal, Pleasanton, CA (US); Rex Emmanuel Fernando, Fremont, CA (US); Syam Sundar Appala, Santa Clara, CA (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/446,338

(22) Filed: Jun. 19, 2019

(51) Int. Cl.
*H04L 12/24* (2006.01)
*H04L 12/715* (2013.01)
*H04L 29/06* (2006.01)
*G06F 9/455* (2018.01)
*H04L 12/721* (2013.01)

(52) U.S. Cl.
CPC ...... *H04L 41/0893* (2013.01); *G06F 9/45558* (2013.01); *H04L 45/34* (2013.01); *H04L 45/64* (2013.01); *H04L 63/0227* (2013.01); *G06F 2009/45595* (2013.01)

(58) Field of Classification Search
CPC ..... H04L 41/0893; H04L 45/34; H04L 45/64; H04L 63/0227; G06F 9/45558; G06F 2009/45595
See application file for complete search history.

(56) References Cited

U.S. PATENT DOCUMENTS

| | | | | |
|---|---|---|---|---|
| 10,333,787 | B2 * | 6/2019 | Harneja | H04L 41/0846 |
| 10,355,989 | B1 * | 7/2019 | Panchal | H04L 45/586 |
| 2016/0337180 | A1 * | 11/2016 | Rao | H04L 67/16 |
| 2017/0244614 | A1 * | 8/2017 | Wu | H04L 65/80 |
| 2018/0006935 | A1 * | 1/2018 | Mutnuru | H04L 45/42 |
| 2018/0309629 | A1 * | 10/2018 | Mohanram | H04L 43/0823 |
| 2018/0309632 | A1 * | 10/2018 | Kompella | H04L 41/50 |
| 2018/0351788 | A1 * | 12/2018 | Tammana | H04L 41/0677 |
| 2018/0351791 | A1 * | 12/2018 | Nagarajan | H04L 41/08 |
| 2018/0367399 | A1 * | 12/2018 | Pani | H04L 61/2007 |
| 2018/0367401 | A1 * | 12/2018 | Harneja | H04L 41/145 |
| 2018/0367412 | A1 * | 12/2018 | Sethi | H04L 41/0853 |
| 2019/0036808 | A1 * | 1/2019 | Shenoy | H04L 45/64 |
| 2019/0173736 | A1 * | 6/2019 | Ponnuswamy | H04L 41/145 |
| 2019/0273715 | A1 * | 9/2019 | Mhaskar | H04L 61/2007 |
| 2019/0379572 | A1 * | 12/2019 | Yadav | H04L 12/4633 |
| 2020/0177503 | A1 * | 6/2020 | Hooda | H04L 45/64 |
| 2020/0204489 | A1 * | 6/2020 | Pianigiani | H04L 45/64 |

* cited by examiner

*Primary Examiner* — Michael Won
(74) *Attorney, Agent, or Firm* — Polsinelli PC

(57) ABSTRACT

Systems, methods, and computer-readable media for providing cross-domain policy enforcement. In some examples, transit VRFs for a destination network domain and a source network domain are created. Route advertisements for nodes coupled to source VRFs in the source network domain are created that include identifications of the source VRFs. The route advertisements can be transmitted from a source transit VRF in the source network domain to a destination transit VRF in the destination network domain. The route advertisements can then be filtered at the destination transit VRF based on a cross-domain policy using the identifications of the source VRFs to export routes to destination VRFs in the destination network domain according to the cross-domain policy.

19 Claims, 11 Drawing Sheets

POLICY PLANE INTEGRATION ACROSS MULTIPLE DOMAINS

TECHNICAL FIELD

The subject matter of this disclosure relates in general to the field of computer networking, and more particularly, to systems and methods for providing cross-domain policy enforcement.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined enterprise network solutions have been developed to address these challenges. Software-defined enterprise networking is part of a broader technology of software-defined networking (SDN) that includes both software-defined wide area networks (SD-WAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and the LAN.

Currently, SDN has been extended to datacenters. Specifically, datacenters have been implemented using SDN solutions, e.g. Cisco® ACI, to provide network services through the datacenters in a more efficient and scalable manner. Specifically, SDN solutions in datacenters can provide centralized automation and policy-driven application profiles for providing network service access. However there are problems with implementing SDN datacenters with other network domains, and in particular with enforcing policies across the domains.

The SDLAN, e.g. Cisco® SD-Access, domain uses constructs of Virtual Networks (VNs)/Scalable Group Tags (SGTs) for network segmentation with two-way connectivity between SGTs. The SDWAN domain uses constructs of VNs and can potentially use SGTs for network segmentation with two-way connectivity between VNs and potentially SGTs. The SDN datacenter domain supports multi-tenancy with each tenant having their own IP address space (and possibly overlapping IP addresses as between two or more tenants), segmentation of a tenant by multiple VRFs, and segmentation of VRFs by multiple endpoint groups (EPGs) with one-way connectivity between EPGs (requiring explicit policy/contract to enable two-way connectivity). As a result, two problems exist for enforcing policies across the software-defined enterprise network domain and the SDN datacenter domain.

Specifically, a discrepancy exists between the one way connectivity provided in the SDN datacenter domain and the two way connectivity provided in the software-defined enterprise network domain. There therefore exist needs for systems and methods of enforcing policies across SDN datacenter domains and software-defined enterprise network domains in light of the discrepancy in one way and two way connectivity that exists across the domains.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
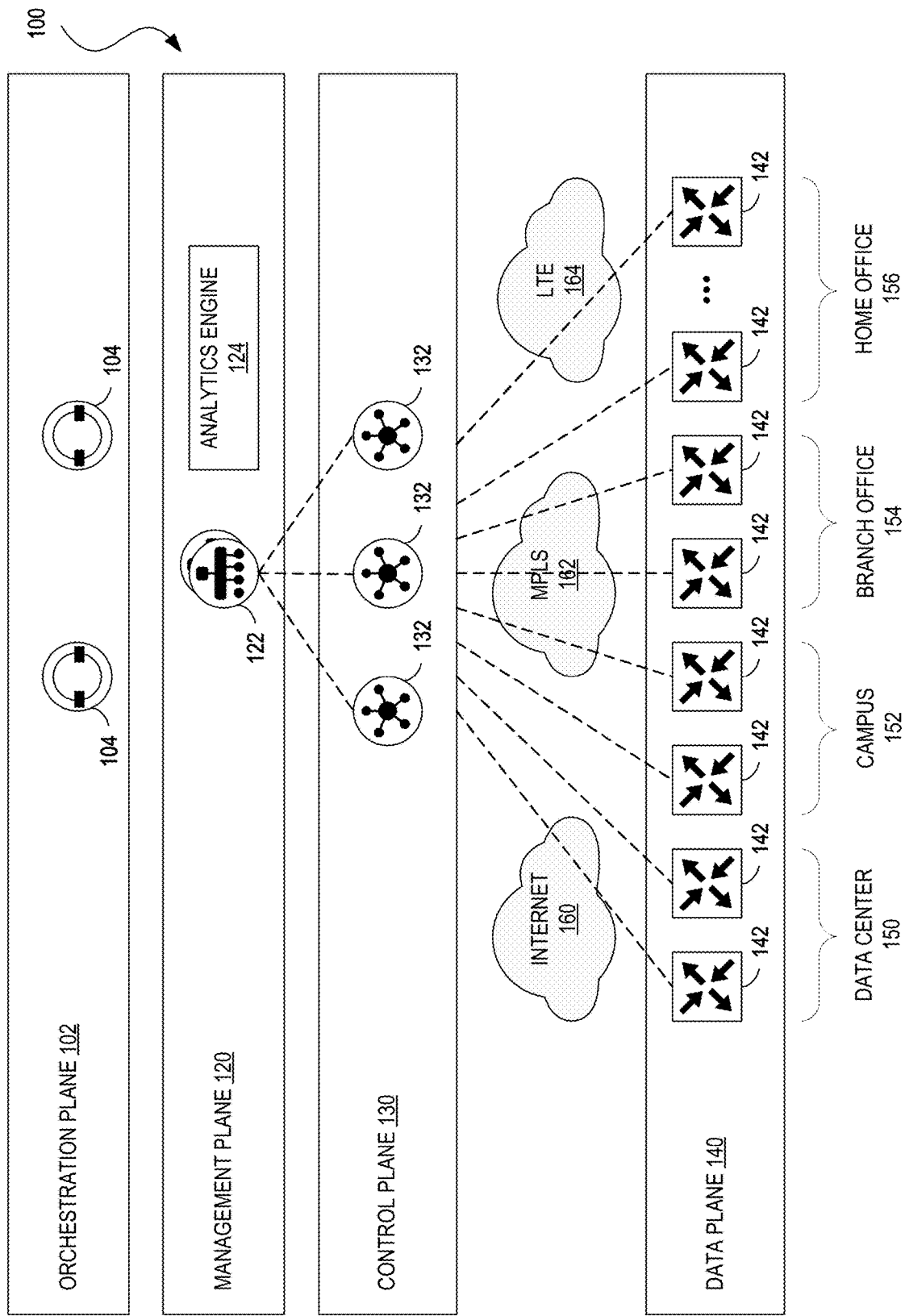
FIG. 1 illustrates an example of a high-level network architecture in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A method can include creating transit VRFs for a software-defined enterprise network domain and a SDN datacenter domain. The method can also include generating, at a source transit VRF of the transit VRFs in a source network domain of one of the software-defined enterprise network domain and the SDN datacenter domain, a first route advertisement for a first route to a first node coupled to a first source VRF in the source network domain. Further, the method can include generating, at the source transit VRF, a second route advertisement for a second route to a second node coupled to a second source VRF in the source network domain. The first route advertisement can include an identification of the first source VRF and the second route advertisement can include an identification of the second VRF. The first route advertisement and the second route advertisement can be transmitted to a destination transit VRF in a destination network domain of one of the software-defined enterprise network domain and the SDN datacenter domain. Additionally, the first route advertisement and the second route advertisement can be filtered at the destination transit VRF based on a cross-domain policy using the identification of the first source VRF and the identification of the second source VRF. Specifically, the first route advertisement and the second route advertisement can be filtered to export the first route and the second route to one or more destination VRFs in the destination network domain according to the cross-domain policy.

A system can include one or more processors and at least one computer-readable storage medium storing instructions which, when executed by the one or more processors, cause the one or more processors to create transit VRFs for a software-defined enterprise network and a SDN datacenter domain. The instructions can also cause the one or more processors to generate, at a source transit VRF of the transit VRFs in a source network domain of one of the software-defined enterprise network domain and the SDN datacenter domain, a first route advertisement for a first route to a first node coupled to a first source VRF in the source network domain. Further, the instructions can cause the one or more processors to generate, at the source transit VRF, a second route advertisement for a second route to a second node coupled to a second source VRF in the source network domain. The first route advertisement can include an identification of the first source VRF and the second route advertisement can include an identification of the second VRF. Further, the instructions can cause the one or more processors to transmit the first route advertisement and the second route advertisement to a destination transit VRF in a destination network domain of one of the software-defined enterprise network domain and the SDN datacenter domain. Additionally, the instructions can the one or more processors to filter the first route advertisement and the second route advertisement at the destination transit VRF based on a cross-domain policy using the identification of the first source VRF and the identification of the second source VRF. Specifically, the first route advertisement and the second route advertisement can be filtered to export the first route and the second route to one or more destination VRFs in the destination network domain according to the cross-domain policy.

A non-transitory computer-readable storage medium having stored therein instructions which, when executed by a processor, cause the processor to create transit VRFs for a software-defined enterprise network and a SDN datacenter domain. The instructions can also cause the processor to generate, at a source transit VRF of the transit VRFs in a source network domain of one of the software-defined enterprise network domain and the SDN datacenter domain, a first route advertisement for a first route to a first node coupled to a first source VRF in the source network domain. The first route advertisement can include an identification of the first source VRF. Further, the instructions can cause the processor to transmit the first route advertisement to a destination transit VRF in a destination network domain of one of the software-defined enterprise network domain and the SDN datacenter domain. Additionally, the instructions can the processor to filter the first route advertisement at the destination transit VRF based on a cross-domain policy using the identification of the first source VRF. Specifically, the first route advertisement can be selectively filtered to export the first route to one or more destination VRFs in the destination network domain according to the cross-domain policy.

Example Embodiments

FIG. 1 illustrates an example of a network architecture 100 for implementing aspects of the present technology. An example of an implementation of the network architecture 100 is the Cisco® Software Defined Wide Area Network (SD-WAN) architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
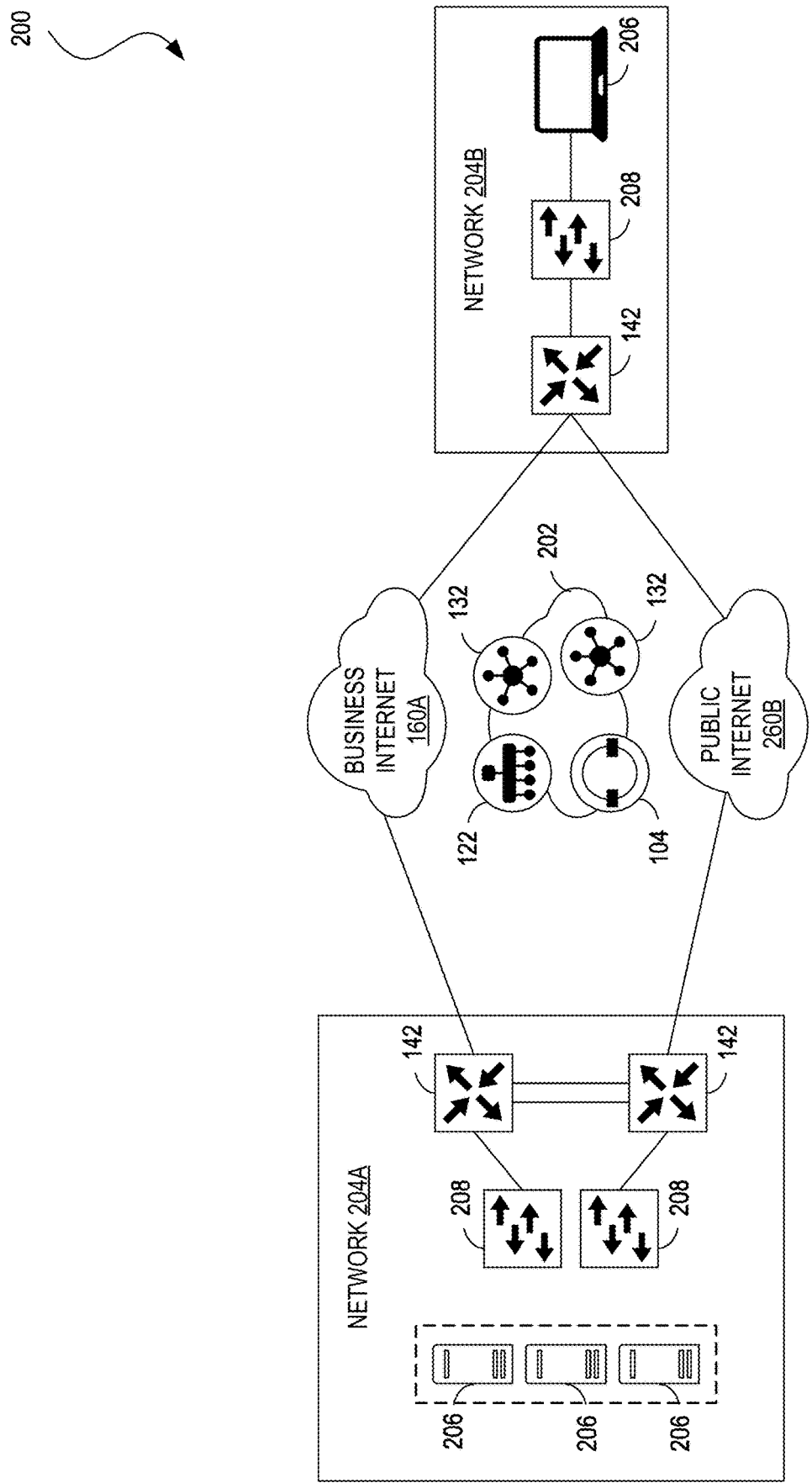
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
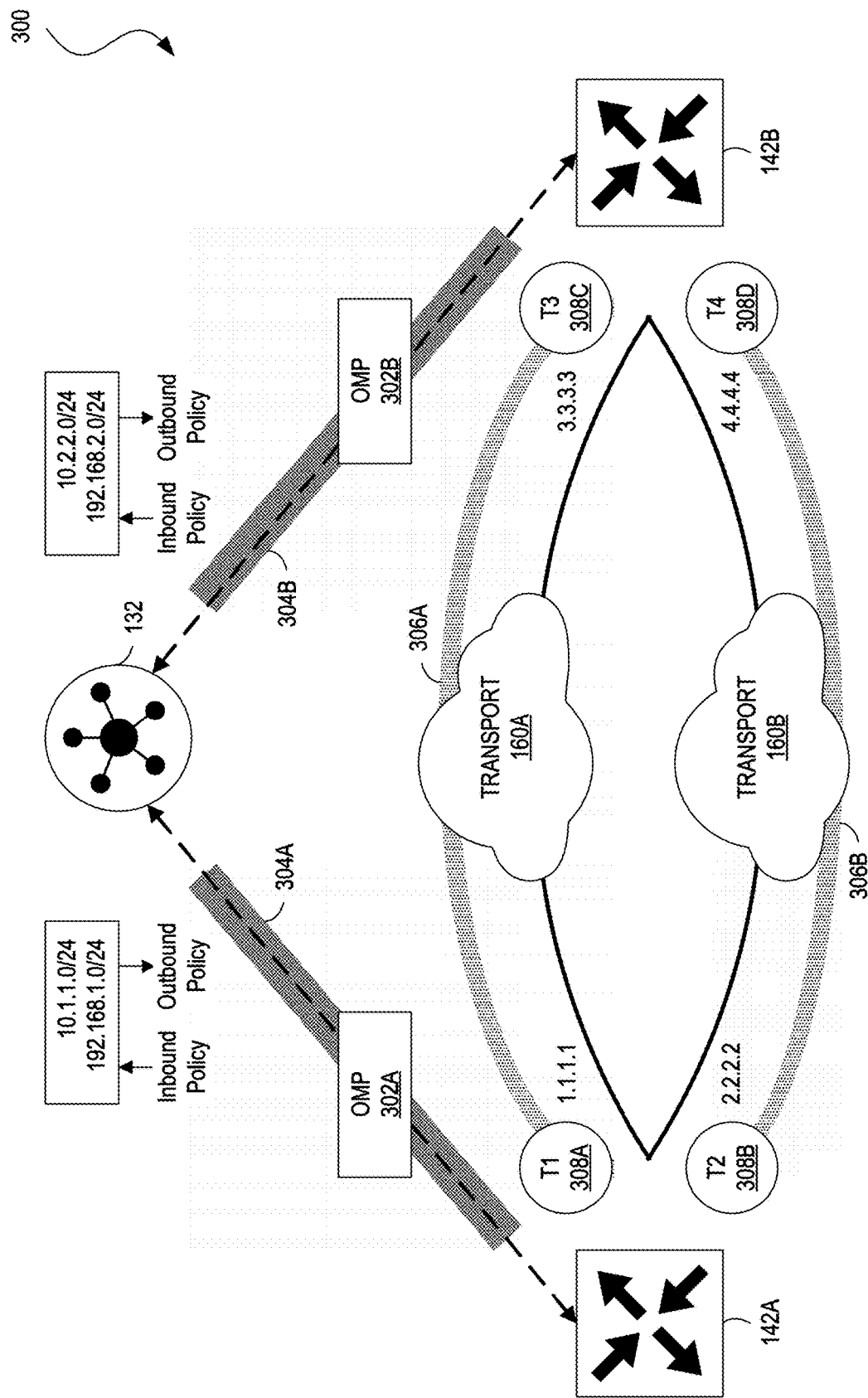
FIG. 3 illustrates an example of a diagram showing the operation of a protocol for managing an overlay network in accordance with an embodiment.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:
  OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
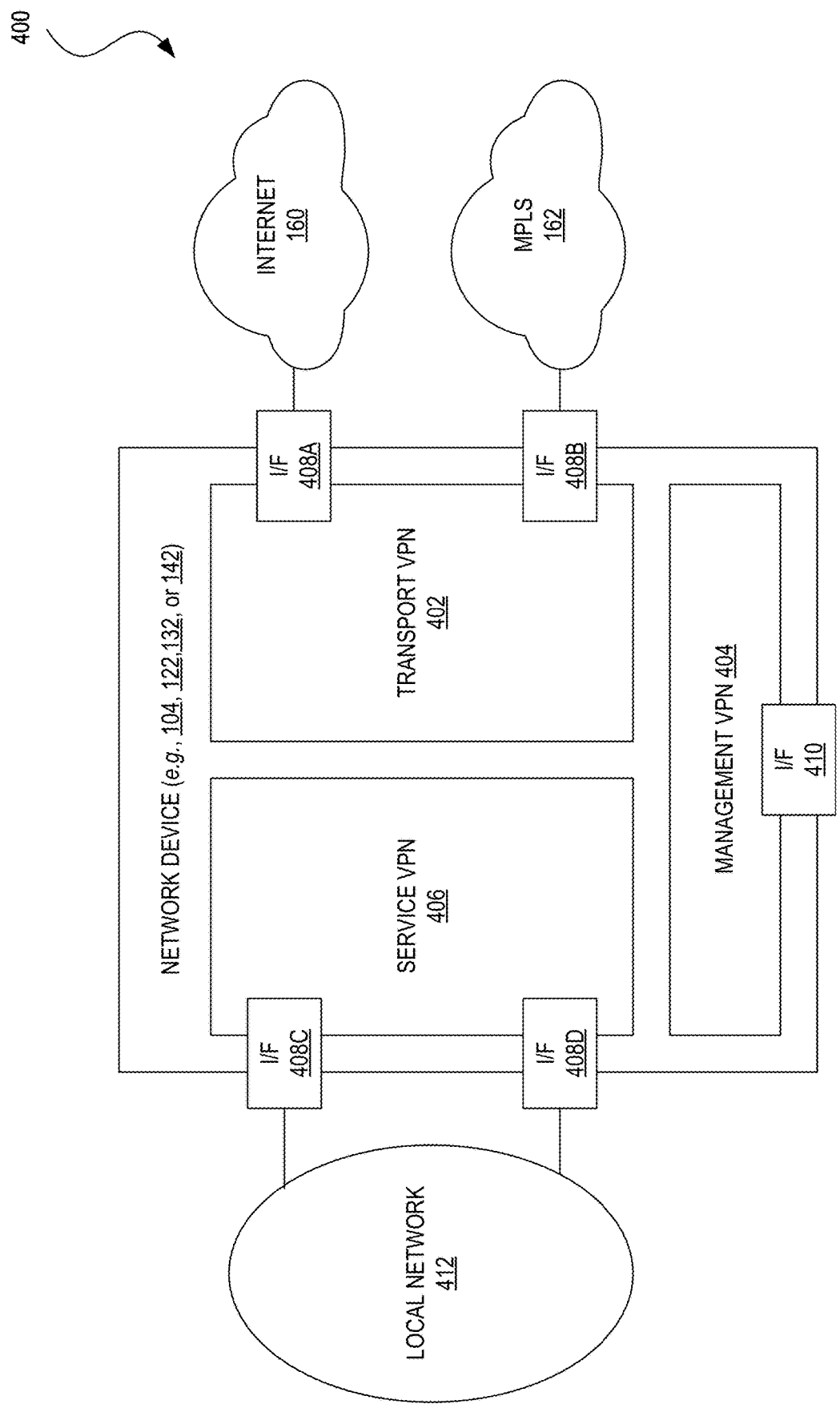
FIG. 4 illustrates an example of a diagram showing the operation of virtual private networks for segmenting a network in accordance with an embodiment.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5A:
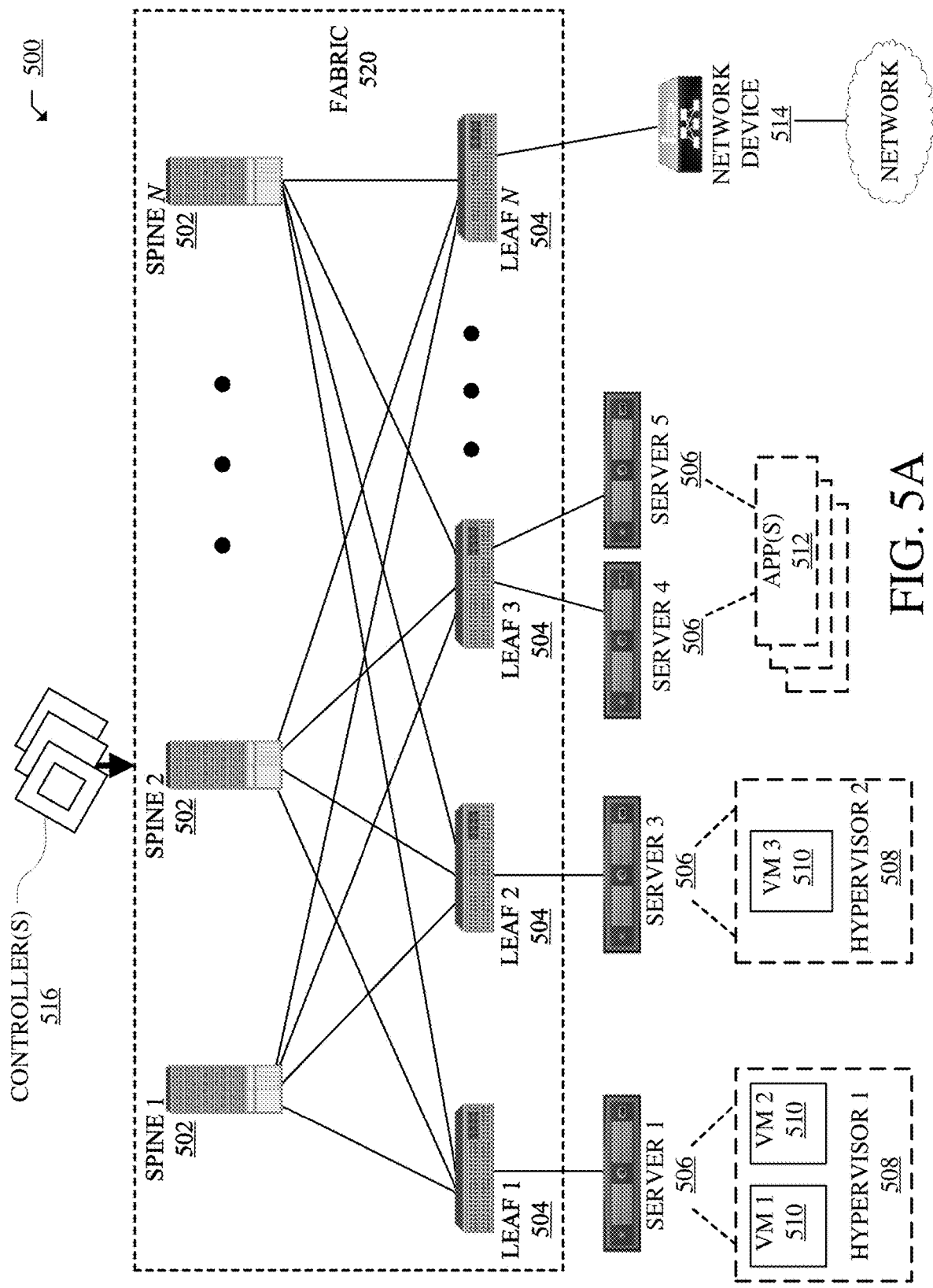
FIG. 5A illustrates a diagram of an example Network Environment, such as a data center.

FIG. 5A illustrates a diagram of an example Network Environment 500, such as a data center. In some cases, the Network Environment 500 can include a data center, which can support and/or host a cloud environment. The Network Environment 500 can include a Fabric 520 which can represent the physical layer or infrastructure (e.g., underlay) of the Network Environment 500. Fabric 520 can include Spines 502 (e.g., spine routers or switches) and Leafs 504 (e.g., leaf routers or switches) which can be interconnected for routing or switching traffic in the Fabric 520. Spines 502 can interconnect Leafs 504 in the Fabric 520, and Leafs 504 can connect the Fabric 520 to an overlay or logical portion of the Network Environment 500, which can include application services, servers, virtual machines, containers, endpoints, etc. Thus, network connectivity in the Fabric 520 can flow from Spines 502 to Leafs 504, and vice versa. The interconnections between Leafs 504 and Spines 502 can be redundant (e.g., multiple interconnections) to avoid a failure in routing. In some embodiments, Leafs 504 and Spines 502 can be fully connected, such that any given Leaf is connected to each of the Spines 502, and any given Spine is connected to each of the Leafs 504. Leafs 504 can be, for example, top-of-rack ("ToR") switches, aggregation switches, gateways, ingress and/or egress switches, provider edge devices, and/or any other type of routing or switching device.

Leafs 504 can be responsible for routing and/or bridging tenant or customer packets and applying network policies or rules. Network policies and rules can be driven by one or more Controllers 516, and/or implemented or enforced by one or more devices, such as Leafs 504. Leafs 504 can connect other elements to the Fabric 520. For example, Leafs 504 can connect Servers 506, Hypervisors 508, Virtual Machines (VMs) 510, Applications 512, Network Device 514, etc., with Fabric 520. Such elements can reside in one or more logical or virtual layers or networks, such as an overlay network. In some cases, Leafs 504 can encapsulate and decapsulate packets to and from such elements (e.g., Servers 506) in order to enable communications throughout Network Environment 500 and Fabric 520. Leafs 504 can also provide any other devices, services, tenants, or workloads with access to Fabric 520. In some cases, Servers 506 connected to Leafs 504 can similarly encapsulate and decapsulate packets to and from Leafs 504. For example, Servers 506 can include one or more virtual switches or routers or tunnel endpoints for tunneling packets between an overlay or logical layer hosted by, or connected to, Servers 506 and an underlay layer represented by Fabric 520 and accessed via Leafs 504.

Applications 512 can include software applications, services, containers, appliances, functions, service chains, etc. For example, Applications 512 can include a firewall, a database, a CDN server, an IDS/IPS, a deep packet inspection service, a message router, a virtual switch, etc. An application from Applications 512 can be distributed, chained, or hosted by multiple endpoints (e.g., Servers 506, VMs 510, etc.), or may run or execute entirely from a single endpoint.

VMs 510 can be virtual machines hosted by Hypervisors 508 or virtual machine managers running on Servers 506. VMs 510 can include workloads running on a guest operating system on a respective server. Hypervisors 508 can provide a layer of software, firmware, and/or hardware that creates, manages, and/or runs the VMs 510. Hypervisors 508 can allow VMs 510 to share hardware resources on Servers 506, and the hardware resources on Servers 506 to appear as multiple, separate hardware platforms. Moreover, Hypervisors 508 on Servers 506 can host one or more VMs 510.

In some cases, VMs 510 can be migrated to other Servers 506. Servers 506 can similarly be migrated to other physical locations in Network Environment 500. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 506, Hypervisors 508, and/or VMs 510 can represent or reside in a tenant or customer space. Tenant space can include workloads, services, applications, devices, networks, and/or resources that are associated with one or more clients or subscribers. Accordingly, traffic in Network Environment 500 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 516, Servers 506, Leafs 504, etc.

Configurations in Network Environment 500 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., ACI or VMWARE NSX). To illustrate, one or more administrators can define configurations at a logical level (e.g., application or software level) through Controllers 516, which can implement or propagate such configurations through Network Environment 500. In some examples, Controllers 516 can be Application Policy Infrastructure Controllers (APICs) in an ACI framework. In other examples, Controllers 516 can be one or more management components for associated with other SDN solutions, such as NSX Managers.

Such configurations can define rules, policies, priorities, protocols, attributes, objects, etc., for routing and/or classifying traffic in Network Environment 500. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 500, such as Leafs 504, Servers 506, Hypervisors 508, Controllers 516, etc. As previously explained, Network Environment 500 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 500. Endpoints can have one or more attributes such as a VM name, guest OS name, a security tag, application profile, etc. Application configurations can be applied between EPGs, instead of endpoints directly, in the form of contracts. Leafs 504 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 504 can tie packets with their attribute EPGs based on their identifiers and enforce policies, which can be implemented and/or managed by one or more Controllers 516. Leaf 504 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 5A, Network Environment 500 can deploy different hosts via Leafs 504, Servers 506, Hypervisors 508, VMs 510, Applications 512, and Controllers 516, such as VMWARE ESXi hosts, WINDOWS HYPER-V hosts, bare metal physical hosts, etc. Network Environment 500 may interoperate with a variety of Hypervisors 508, Servers 506 (e.g., physical and/or virtual servers), SDN orchestration platforms, etc. Network Environment 200 may implement a declarative model to allow its integration with application design and holistic network policy.

Controllers 516 can provide centralized access to fabric information, application configuration, resource configuration, application-level configuration modeling for a SDN infrastructure, integration with management systems or servers, etc. Controllers 516 can form a control plane that interfaces with an application plane via northbound APIs and a data plane via southbound APIs.

As previously noted, Controllers 516 can define and manage application-level model(s) for configurations in Network Environment 500. In some cases, application or device configurations can also be managed and/or defined by other components in the network. For example, a hypervisor or virtual appliance, such as a VM or container, can run a server or management tool to manage software and services in Network Environment 500, including configurations and settings for virtual appliances.

As illustrated above, Network Environment 500 can include one or more different types of SDN solutions, hosts, etc. For the sake of clarity and explanation purposes, various examples in the disclosure will be described with reference to an ACI framework, and Controllers 516 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 506 (e.g., physical or logical), Hypervisors 508, VMs 510, containers (e.g., Applications 512), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 5B:
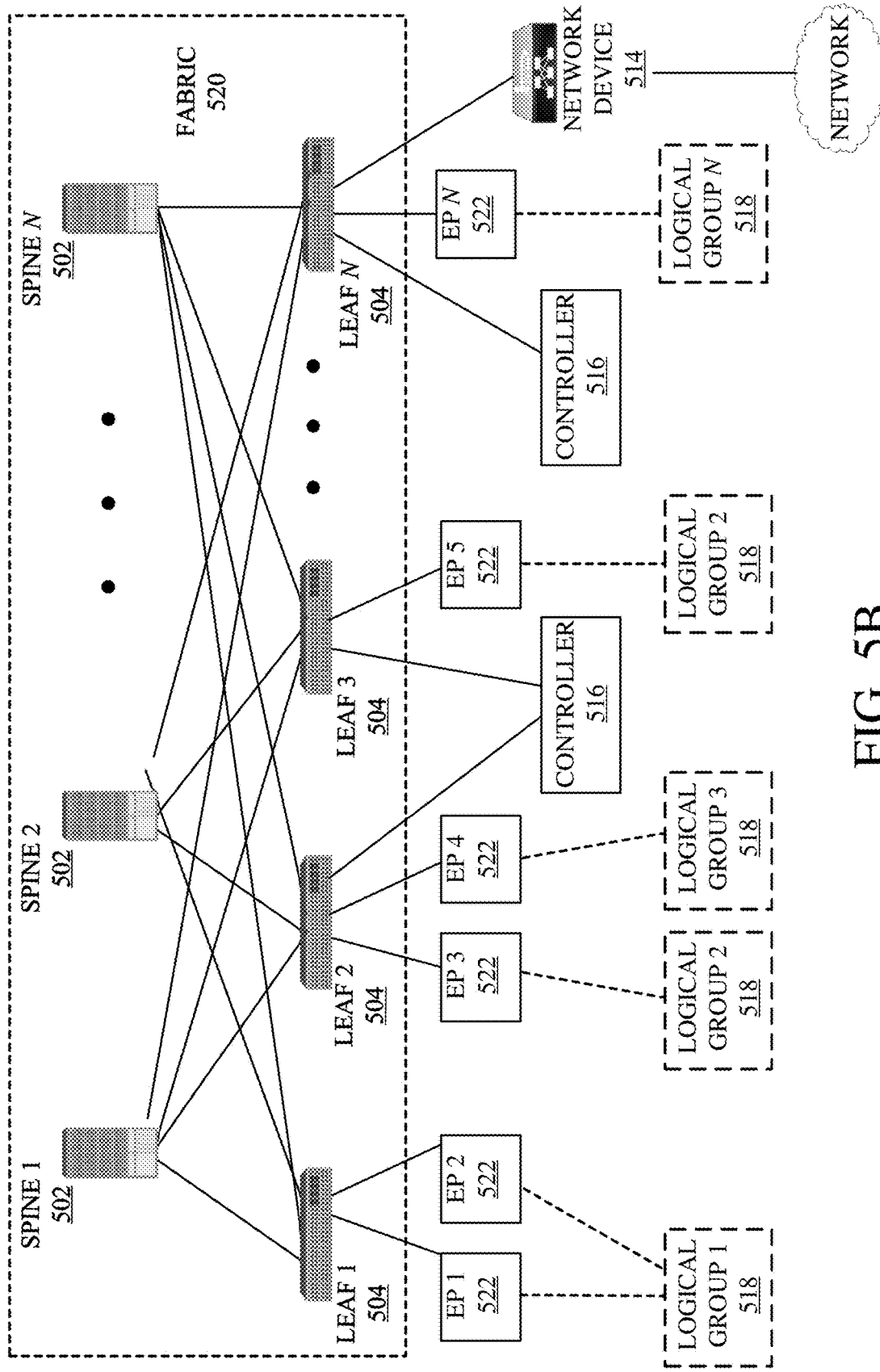
FIG. 5B illustrates another example of Network Environment.

FIG. 5B illustrates another example of Network Environment 500. In this example, Network Environment 500 includes Endpoints 522 connected to Leafs 504 in Fabric 520. Endpoints 522 can be physical and/or logical or virtual entities, such as servers, clients, VMs, hypervisors, software containers, applications, resources, network devices, workloads, etc. For example, an Endpoint 522 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 522 can have an address (e.g., an identity), a location (e.g., host, network segment, VRF instance, domain, etc.), one or more attributes (e.g., name, type, version, patch level, OS name, OS type, etc.), a tag (e.g., security tag), a profile, etc.

Endpoints 522 can be associated with respective Logical Groups 518. Logical Groups 518 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 518 are EPGs in an ACI environment and/or other logical groups (e.g., SGs) in another SDN environment.

Traffic to and/or from Endpoints 522 can be classified, processed, managed, etc., based Logical Groups 518. For example, Logical Groups 518 can be used to classify traffic to or from Endpoints 522, apply policies to traffic to or from Endpoints 522, define relationships between Endpoints 522, define roles of Endpoints 522 (e.g., whether an endpoint consumes or provides a service, etc.), apply rules to traffic to or from Endpoints 522, apply filters or access control lists (ACLs) to traffic to or from Endpoints 522, define communication paths for traffic to or from Endpoints 522, enforce requirements associated with Endpoints 522, implement security and other configurations associated with Endpoints 522, etc.

In an ACI environment, Logical Groups 518 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

As discussed previously, the enterprise network landscape is continuously evolving. There is a greater demand for mobile and IoT device traffic, SaaS applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple MPLS transports, or MPLS paired with Internet or LTE links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined enterprise network solutions have been developed to address these challenges. Software-defined enterprise networking is part of a broader technology of SDN. SDN is a centralized approach to network management which can abstract away the underlying network infrastructure from its applications. This decoupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and LAN associated with an enterprise.

Currently, SDN has been extended to datacenters. Specifically, datacenters have been implemented using SDN solutions, e.g. Cisco® ACI, to provide network services through the datacenters in a more efficient and scalable manner. Specifically, SDN solutions in datacenters can provide centralized automation and policy-driven application profiles for providing network service access. However there are problems with implementing SDN datacenters with other network domains, in particular with enforcing policies across the domains.

The SDLAN, e.g. Cisco® SD Access, domain uses constructs of VNs and SGTs for network segmentation with two-way connectivity between SGTs. The SDWAN domain uses constructs of VNs and can potentially use SGTs for network segmentations with two-way connectivity between VNs and potentially SGTs. The SDN datacenter domain supports multi-tenancy with each tenant having their own IP address space (and possibly overlapping IP addresses as between two or more tenants), segmentation of a tenant by multiple VRFs, and segmentation of VRFs by multiple endpoint groups (EPGs) with one-way connectivity between EPGs (requiring explicit policy/contract to enable two-way connectivity). As a result, problems exist for enforcing policies across the software-defined enterprise network domain and the SDN datacenter domain. Specifically, a discrepancy exists through the one way connectivity provided in the SDN datacenter domain and the two way connectivity provided in the software-defined enterprise network domain.

The present includes systems, methods, and computer-readable media for solving these problems/discrepancies while providing for cross-domain policy control, e.g. across the software-defined enterprise network domain and the SDN datacenter domain. Specifically, transit VRFs for a software-defined enterprise network domain and a SDN datacenter domain can be created. A first route advertisement for a first route to a first node coupled to a first source VRF in the source network domain can be generated at a source transit VRF of the transit VRFs in a source network domain of one of the software-defined enterprise network domain and the SDN datacenter domain. Further, a second route advertisement for a second route to a second node coupled to a second source VRF can be generated in the source network domain at the source transit VRF. The first route advertisement can include an identification of the first source VRF and the second route advertisement can include an identification of the second VRF. The first route advertisement and the second route advertisement can be transmitted to a destination transit VRF in a destination network domain of one of the software-defined enterprise network domain and the SDN datacenter domain. Additionally, the first route advertisement and the second route advertisement can be filtered at the destination transit VRF based on a cross-domain policy using the identification of the first source VRF and the identification of the second source VRF. Specifically, the first route advertisement and the second route advertisement can be filtered to export the first route and the second route to one or more destination VRFs in the destination network domain according to the cross-domain policy.

The present systems, methods, and computer-readable media are advantageous over current cross-domain enforcement techniques for a number of reasons. Specifically, inter-VN lookup can be done in fabric control planes and avoids duplicating hardware route entries. Further, inter-VN lookup policy can be automatically created and updated, making it a single point of management. Additionally, as inter-VN lookup can be done on the control plane node, SGT context can be maintained. Further, inter-VN forwarding can occur at the fabric edge (same intra-VN), thereby avoiding traffic hairpins at the border node. Also, inter-VN segmentation can be preserved and inter-VN forwarding can be achieved across separate domains, e.g. the SDN datacenter domain and software-defined enterprise network domains, without having to stretch data plane segments between the domains. This is advantageous as stretching data plane segments across domains makes the provisioning and management of the Network-to-Network-Interface (NNI) between these domains complicated and therefore challenging. In turn, this simplifies the NNI significantly, by avoiding the need for data plane segmentation in the NNI.

Figure 6:
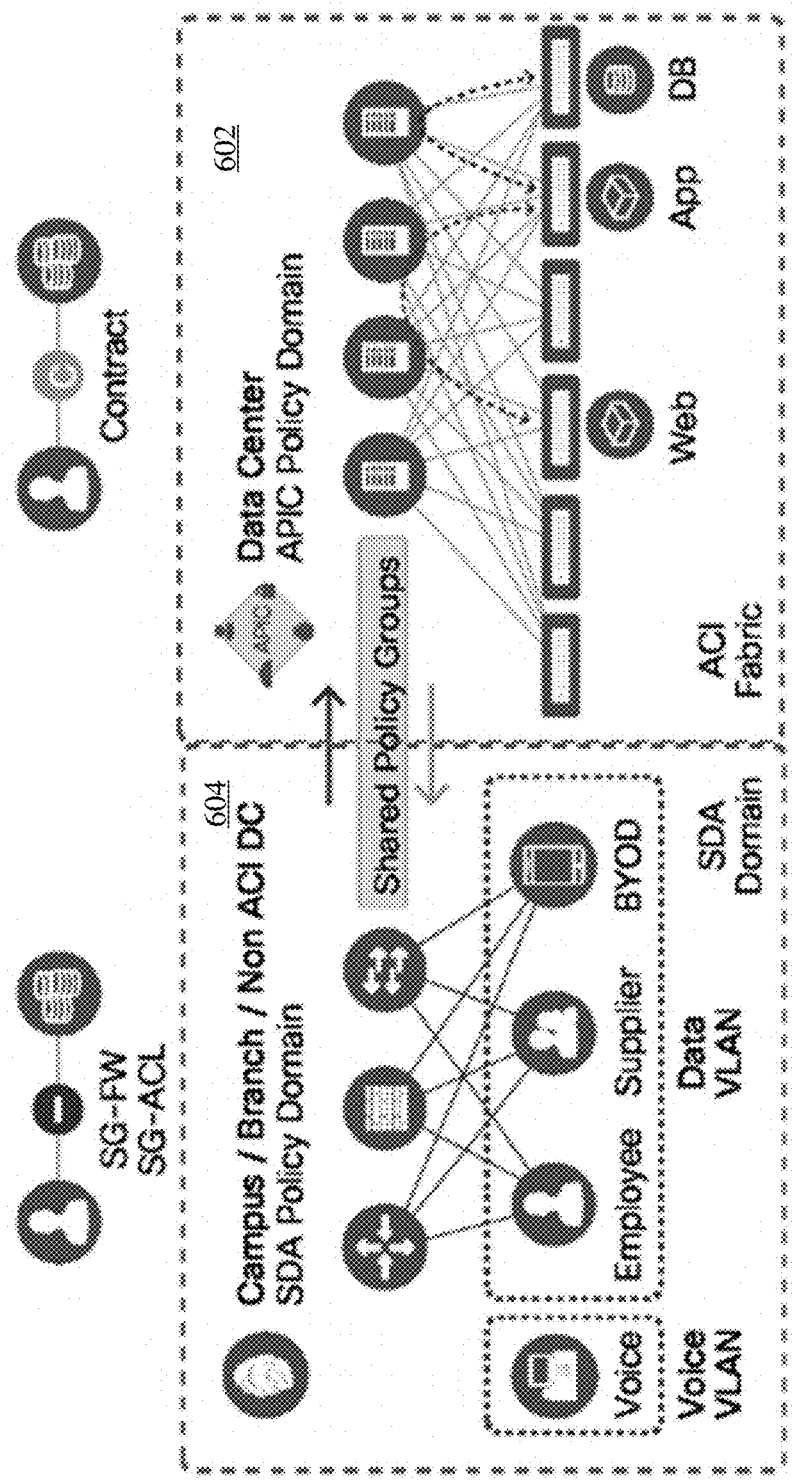
FIG. 6 shows an example network environment for sharing policy information across network domains.

FIG. 6 shows an example network environment 600 for sharing policy information across network domains. The example network environment 600 includes an SDN datacenter domain 602 and a software-defined enterprise network domain 604. The SDN datacenter domain 602 can be an applicable SDN datacenter domain, however for purposes of this discussion, the SDN datacenter domain 602 is described as being implemented through a Cisco ACI fabric. Further, the software-defined enterprise network domain 604 can be an applicable software-defined enterprise network, e.g. a SDWAN or a SDLAN, however for purposes of this discussion, the software-defined enterprise network domain 602 is described as being implemented through a SDLAN, Cisco SD-Access (SDA) domain.

ACI is a data center architecture with centralized automation and policy-driven application profiles. ACI can use EPGs as the main policy construct for defining policy within the ACI fabric. EPGs can identify application workloads in the ACI fabric. Further, and as discussed previously, end nodes in the SDA domain can be identified and grouped according to SGTs. Accordingly, SGTs can be used to define and enforce policy within the SDA domain.

Endpoint identifiers (SGTs and EPGs) can be federated across both the software-defined enterprise network domain 604 and the SDN datacenter domain 602. For example and with respect to the software-defined enterprise network domain 604, an applicable engine for controlling network service access in the software-defined enterprise network domain 604, e.g. an Identity Services Engine (ISE), can share selected SGTs with the SDN datacenter domain 602, e.g. ACI, as well as read EPGs from ACI. The sharing of the SGTs can take the form of writing SGT names into the ACI fabric as EPG names with a specific ACI construct that builds policies for external connectivity (referred to as Layer 3 Out). Specifically, the SGTs can be shared with VRFs in the SDN datacenter domain 602. Similarly, the SDN datacenter domain 602 can provide all of its policy service relationships between SGTs and EPGs to the software-defined enterprise network domain 604. As follows, the software-defined enterprise network domain 604, e.g. ISE, can read EPGs and policy service relations between SGTs and distribute them across the software-defined enterprise network domain 604, e.g. share them across VRFs in the software-defined enterprise network domain 604. Accordingly, cross-domain policies, corresponding to the shared policy groups, can be generated and enforced across the software-defined enterprise network domain 604 and the SDN datacenter domain 602 according to these techniques.

A cross-domain policy can specify network relationships between nodes, e.g. corresponding EPGs and SGTs, within the network environment 600. For example, a cross-domain policy can specify that an EPG should not communicate with a client associated with a specific SGT. Further, a cross-domain policy can specify network relationships between VRFs across the domains 602 and 604 in the network environment 600. For example, a cross-domain policy can specify that a specific VRF in the SDN datacenter domain 602 should not communicate with a specific node in the software-defined enterprise network domain 604. In another example, a cross-domain policy can specify that a specific VRF in the software-defined enterprise network domain 604 is allowed to communicate with a specific VRF in the SDN datacenter domain 602.

Figure 7:
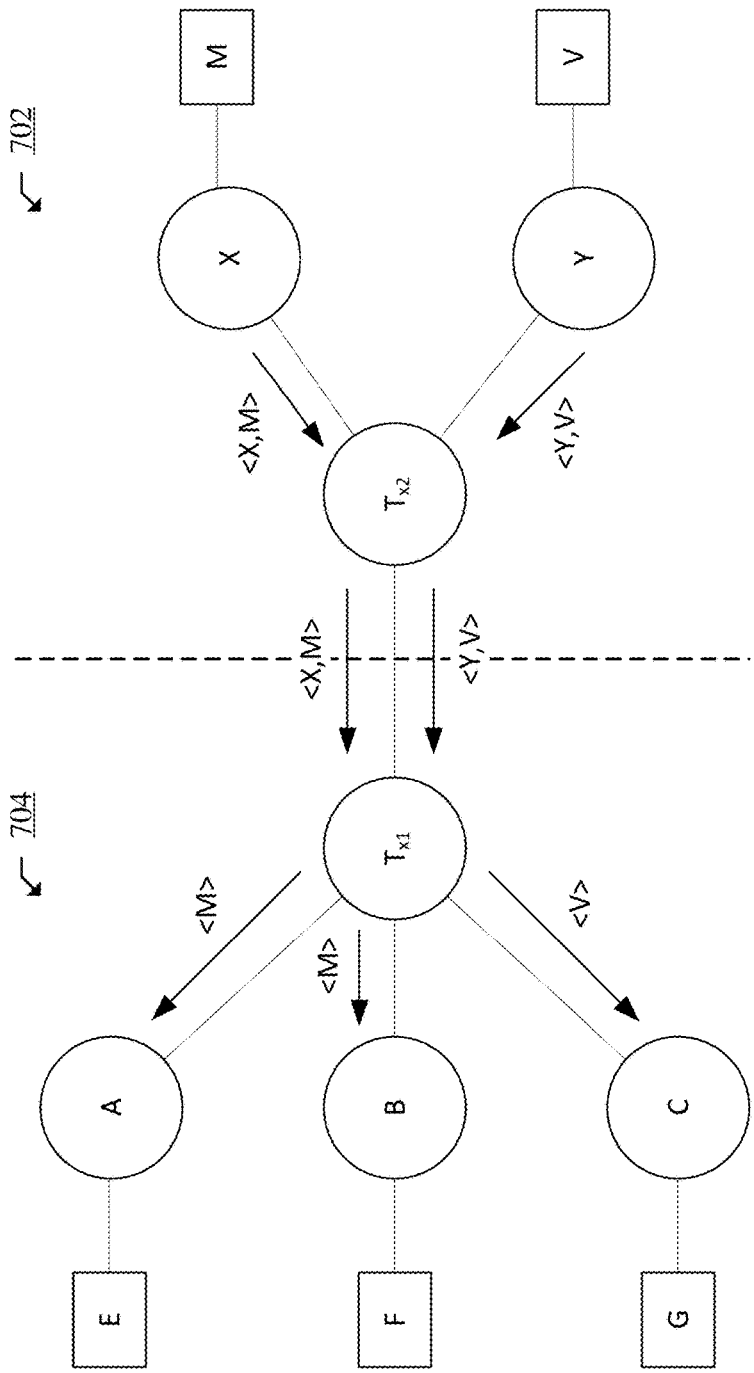
FIG. 7 shows an example network environment with multiple network domains for enforcing policy across the network domains

FIG. 7 shows an example network environment 700 with multiple network domains for enforcing policy across the network domains. The network environment 700 includes a source network domain 702 and a destination network domain 704. The source network domain 702 can be a source of network traffic and routes for network traffic in the network environment 700. As follows, the destination network domain 704 can be a destination of network traffic and routes for network traffic in the network environment 700. In various embodiments, the source network domain 702 can act as a destination of network traffic and routes for network traffic and therefore act as a destination network domain. However, for the purposes of this discussion, the source network domain 702 is referred to and functions as a source network domain. Further, the destination network domain 704 can act as a source of network traffic and routes for network traffic and therefore act as a source network domain. However, for the purposes of this discussion, the destination network domain 704 is referred to and functions as a destination network domain.

The source network domain 702 can be a software-defined enterprise network domain. For example, the source network domain 702 can be a campus network. Alternatively, the source network domain 702 can be a SDN datacenter domain. For example, the source network domain 702 can be implemented in an ACI infrastructure. Similarly, the destination network domain 704 can be either a software-defined enterprise network domain or a SDN datacenter domain. The source network domain 702 and the destination network domain 704 can be different types of network domains. For example, the source network domain 702 can be a software-defined enterprise network domain and the destination network domain 704 can be a SDN datacenter domain. In another example, the source network domain 702 can be a SDN datacenter domain and the source network domain 702 can be a software-defined enterprise network domain.

The source network domain 702 includes VRFs X and Y coupled to a transit VRF $T_{x2}$. Transit VRF $T_{x2}$ functions to transmit data from the source network domain 702 and receive data for the source network domain 702. Specifically, the transit VRF $T_{x2}$ functions to transmit data from the source network domain 702 to the destination network domain 704 and conversely receive data from the destination network domain 704 for the source network domain 702. Transit VRF $T_{x2}$ can be created for purposes of sending data from and receiving data for the source network domain 702. While only a single transit VRF is shown in the source network domain 702 for purposes of illustration, the source network domain 702 can include a plurality of transit VRFs.

Corresponding hosts/nodes, within corresponding IP prefixes/subnets M and V, are coupled to VRFs X and Y. Specifically, node M is coupled to VRF X, while node Y is coupled to VRF Y. The nodes M and V can be applicable nodes in a network domain, e.g. based on a type of network domain of the source network domain 702. Specifically, the nodes M and V can be identifiable by applicable tags and groupings based on a type of network domain of the source network domain 702. For example, the hosts/nodes within the IP prefixes/subnets M and V can be endpoints identifiable by EPGs in an SDN datacenter. In another example, the hosts/nodes within the IP prefixes/subnets M and V can be endpoints identifiable by SGTs in a software-defined enterprise network. The VRFs X and Y can function to transmit data to and from the corresponding nodes M and V coupled to the VRFs X and Y. Specifically, the VRFs X and Y can transmit data from the corresponding nodes M and N to the transit VRF $T_{x2}$ as part of routes in the source network domain 702. Further, the VRFs X and Y can transmit data from the transit VRF $T_{x2}$ to the corresponding nodes M and N as part of routes in the source network domain 702.

The destination network domain 704 includes VRFs A, B, and C coupled to a transit VRF $T_{x1}$. The transit VRF $T_{x1}$ can be created and function to transmit data from the destination network domain 704 and receive data for the destination network domain 704. Specifically, the transit VRF $T_{x1}$ functions to receive data from the source network domain 702 for the destination network domain 704 and transmit data from the destination network domain 704 to the source network domain 702. Transit VRF $T_{x1}$ can be created for purposes of sending data from and receiving data for the destination network domain 704. While only a single transit VRF is shown in the destination network domain 704 for purposes of illustration, the destination network domain 704 can include a plurality of transit VRFs.

Corresponding hosts/nodes, within corresponding IP prefixes/subnets E, F, and G, are coupled to corresponding VRFs A, B, and C. Specifically, node E is coupled to VRF A, node F is coupled to VRF B, and node G is coupled to VRF C. The nodes E, F, and G can be applicable nodes in a network domain, e.g. based on a type of network domain of the destination network domain 704. Specifically, the nodes E, F, and G can be identifiable by applicable tags and groupings based on a type of network domain of the destination network domain 704. For example, the hosts/nodes within the IP prefixes/subnets E, F, and G can be endpoints identifiable by SGTs in a software-defined enterprise network. In another example, the hosts/nodes within the IP prefixes/subnets E, F, and G can be endpoints identifiable by EPGs in an SDN datacenter. The VRFs A, B, and C can function to transmit data to and from the corresponding nodes E, F, and G coupled to the VRFs A, B, and C. Specifically, the VRFs A, B, and C can transmit data from the corresponding nodes E, F, and G to the transit VRF $T_{x1}$ as part of routes in the destination network domain 704. Further, the VRFs A, B, and C can transmit data from the transit VRF $T_{x1}$ to the corresponding nodes E, F, and G as part of routes in the destination network domain 704.

The transit VRFs $T_{x1}$ and $T_{x2}$ can transmit data between each other to transmit data across the source network domain 702 and the destination network domain 704. Specifically, and as will be discussed in greater detail later, the transit VRFs $T_{x1}$ and $T_{x2}$ can transmit data between each other to enforce policy, e.g. cross-domain policy, across the source network domain 702 and the destination network domain 704. For example, transit VRF $T_{x2}$ can transmit data for routes in the source network domain 702 to transit VRF $T_{x1}$ for enforcing cross-domain policy in the destination network domain 704. Similarly, transit VRF $T_{x1}$ can transmit data for routes in the destination network domain 704 to transit VRF $T_{x2}$ for enforcing cross-domain policy in the source network domain 702 and across the domains 702 and 704.

The transit VRF $T_{x1}$ can generate route advertisements for the source network domain 702. A route advertisement, as used herein, can include an endpoint identifier (EID) address/prefix of a node in a network environment. For example, the transit VRF $T_{x1}$ can generate a route advertisement for node M that includes an EID of the node M, e.g. 10.1.1. In another example, the transit VRF $T_{x1}$ can generate a route advertisement for node V that includes an EID/address of the node V, e.g. 10.2.2. Further a route advertisement, can include an identifier of a VRF coupled to a node in a network environment. Specifically, a route advertisement can include an identifier/context of a VRF, e.g. also referred to as a color of a VRF, coupled between a node in a network environment and a transit VRF in the network environment that forms a route in the network environment. For example, the transit VRF $T_{x1}$ can generate a route advertisement for node M that includes an identification of VRF X, e.g. as route advertisement <X,M>. Similarly, the transit VRF $T_{x2}$ can generate a route advertisement for node V that includes an identification of VRF Y, e.g. as route advertisement <Y,V>.

The source network domain 702 can transmit the route advertisements, e.g. <X,M> and <Y,V> to the destination network domain 704, e.g. between corresponding transit VRFs in the domains 702 and 704. Specifically, the source network domain 702 can use Multiprotocol-Border Gateway Protocol (MP-BGP) VPN to transmit route advertisements to the destination network domain 704. Vice versa, the destination network domain 704 can us MP-BGP VPN to transmit route advertisements to the source network domain 702. While reference is made to MP-BGP VPN to transmit route advertisements between the source network domain 702 and the destination network domain 704, an applicable protocol or information exchange mechanism can be used to transmit route advertisements between the source network domain 702 and the destination network domain 704.

The source network domain 702 can transmit the route advertisements to the destination network domain 704 based on whether the route advertisements are generated for nodes having address overlap. Specifically, the source network domain 702 can transmit the route advertisements to the destination network domain 704 based on whether node M and node V have the same address or EPI. By transmitting route advertisements between the source network domain 702 and the destination network domain 704, e.g. between a SDN datacenter domain and a SDWAN domain, based on identifiers of VRFs associated with nodes, policy can be enforced across the domains even when overlapping node prefixes occur.

In transmitting the route advertisements based on address overlap, the source network domain 702 can determine whether nodes, e.g. nodes M and V have address overlap, e.g. share the same address space. If the source network domain 702 determines that nodes M and V do not have address overlap, then transit VRF $T_{x2}$ can merge the route advertisement of node M, <X,M>, with the route advertisement of node V, <Y,V>, to create a combined route advertisement. Subsequently, transit VRF $T_{x2}$ can transmit the combined route advertisement to the destination network domain 704, e.g. to transit VRF $T_{x1}$. In transmitting the route advertisements as a combined route advertisement to the destination network domain 704, transit VRF $T_{x2}$ can transmit the route advertisements without data plane separation, e.g. through a single data plane channel, in a data plane between the source network domain 702 and the destination network domain 704.

Alternatively, if the source network domain 702 determines that nodes M and V do have address overlap, then the source network domain 702 can transmit route advertisements for nodes M and V separately through a data plane between the source network domain 702 and the destination network domain 704. Specifically, the source network domain 702 can generate separate transit VRFs in the source network domain 702 for separately generating route advertisements for the nodes M and V and transmitting the route advertisements to the destination network domain 704. For example, transit VRF $T_{x2}$ can generate a route advertisement <X,M> for node M and another transit VRF in the source network domain 702 can generate a route advertisement <Y,V> for node V. Subsequently, the transit VRF $T_{x2}$ can transmit route advertisement <X,M> to the destination network domain 704 and the another transit VRF can separately transmit route advertisement <Y,V> to the destination network domain 704 across the data plane. As follows, transit VRFs in the destination network domain 704, e.g. separate transit VRFs, can receive the separately transmitted route advertisements <X,M> and <Y,V>.

In generating route advertisements for nodes in the source network domain 702, transit $T_{x2}$ can import all or a subset of routes to nodes in the source network domain 702. Accordingly, transit $T_{x2}$ can subscribe to all or the subset of routes in the source network domain 702. Specifically, transit $T_{x2}$ can install the prefixes and EIDs of the nodes and identifiers of corresponding VRFs of the nodes in a routing information base (RIB) for the source network domain 702 and transit $T_{x2}$. As will be discussed in greater detail later, the information in the RIB can be used to enforce policy in the source network domain 702 across both the source network domain 702 and the destination network domain 704, e.g. when the source network domain 702 is acting as a destination network domain and the destination network domain 704 is acting as a source network domain.

Transit VRF $T_{x1}$ can use the route advertisements received from the source network domain 702, e.g. from transit VRF $T_{x2}$, to selectively export routes within the destination network domain 704. Specifically, transit VRF $T_{x1}$ can use the route advertisements to export the routes to VRFs within the destination network domain 704. More specifically, transit VRF $T_{x1}$ can export the routes to VRFs within the destination network domain 704 to enforce cross-domain policy across the source network domain 702 and the destination network domain 704 within the destination network domain 704.

In selectively exporting routes within the destination network domain 704, the transit VRF $T_{x1}$ can filter the route advertisements, e.g. the combined route advertisement received from the transit VRF $T_{x2}$. Accordingly, the transit VRF $T_{x1}$ can export routes corresponding to the route advertisements based on the filtering of the route advertisements. For example, the transit VRF $T_{x1}$ can filter the route advertisements and determine to export a route of the route advertisements to VRF A. Subsequently, the transit VRF $T_{x1}$ can export the route to VRF A based on determining to export the route to VRF A through route advertisement filtering.

The transit VRF $T_{x1}$ can filter the route advertisements based on a cross-domain policy for the network environment and the identifiers of VRFs in the route advertisement. Specifically, a cross-domain policy can specify that a specific VRF in the destination network domain 704 is not allowed to communicate with a specific VRF in the source network domain 702 and vice versa. Similarly, a cross-domain policy can specific that a specific VRF in the destination network domain 704 is allowed to communicate with a specific VRF in the source network domain 702 and vice versa. Accordingly, based on the VRFs that are allowed or are not allowed to communicate with each other across the domains 702 and 704, the transit VRF $T_{x1}$ can export specific routes to specific VRFs to set up communications between nodes across the domains 702 and 704 according to the cross-domain policy. For example, if a first VRF in the source network domain 702 is allowed to communicate with a second VRF in the destination network domain 704, as indicated by the cross-domain policy, then the transit VRF $T_{x1}$ can export a route of a first node coupled to the first VRF to the second VRF, thereby allowing for communication between the first node and a second node coupled to the second VRF in the destination network domain 704.

As an example of cross-domain policy enforcement through route advertisement filtering based on VRF identifications, the cross-domain policy can specify that VRFs A and B are allowed to communicate with VRF X and not VRF Y, while VRF C is allowed to communicate with VRF Y but not VRF X. As VRF A and VRF B are allowed to communicate with VRF X, transit VRF $T_{x1}$, based on the identifier of VRF X in the route advertisement for node M<X,M>, can export route <M> to VRFs A and B. Further, as VRF C is not allowed to communicate with VRF X, transit VRF $T_{x1}$, based on the identifier of VRF X in the route advertisement for node M<X,M>, can refrain from exporting route <M> to VRF C. Therefore, nodes E and F can communicate with node M while node G cannot communicate with node M in enforcing the cross-domain policy. Similarly, as VRF C is allowed to communicate with VRF Y, transit $T_{x1}$, based on the identifier of VRF Y in the route advertisement for node V<Y,V>, can export route <V> to VRF C. Further, as VRFs A and B are not allowed to communicate with VRF Y, transit VRF $T_{x1}$, based on the identifier of VRF Y in the route advertisement for node V<Y,V>, can refrain from exporting route <V> to VRFs A and B. Therefore, node G can communicate with node V while nodes E and F cannot communicate with node V in enforcing the cross-domain policy.

As shown in the previously described example, transit VRFs can be configured to export only routes to nodes, e.g. routes corresponding to EIDs of endpoints, and not source VRFs coupled to the endpoints, when exporting routes through route advertisement filtering. For example, transit VRF $T_{x1}$ can export the route to node M<M>, while refraining from exporting the route to only source VRF X<X> from the route advertisement <X,M>. In another example, transit VRF $T_{x1}$ can export the route to node V, while refraining from exporting the route to only VRF Y<Y> from the route advertisement <Y,V>. In exporting only the routes to the nodes, e.g. endpoints, in the source network domain 702 and not the VRFs, transit $T_{x1}$ can effectively enforce reachability policy, e.g. as part of a cross domain policy. For example, by exporting only the route to node M, transit $T_{x1}$ can ensure that nodes E and F communicate with node M and not just VRF X.

While the previous discussion has been described with respect to the source network domain 702 advertising routes to the destination network domain 704 to enforce the cross-domain policy, the destination network domain 704 can also operate similar to the source network domain 702 in advertising routes for purposes of enforcing the cross-domain policy. Specifically, transit VRF $T_{x1}$ can transmit route advertisements for nodes E, F, and G that include identifiers of corresponding VRFs A, B, and C to the transit VRF $T_{x2}$. Subsequently, transit VRF $T_{x2}$ can filter the route advertisements to export routes to nodes E, F, and G to VRFs X and Y according to the cross-domain policy based on the identifiers of the corresponding VRFs A, B, and C.

Figure 8:
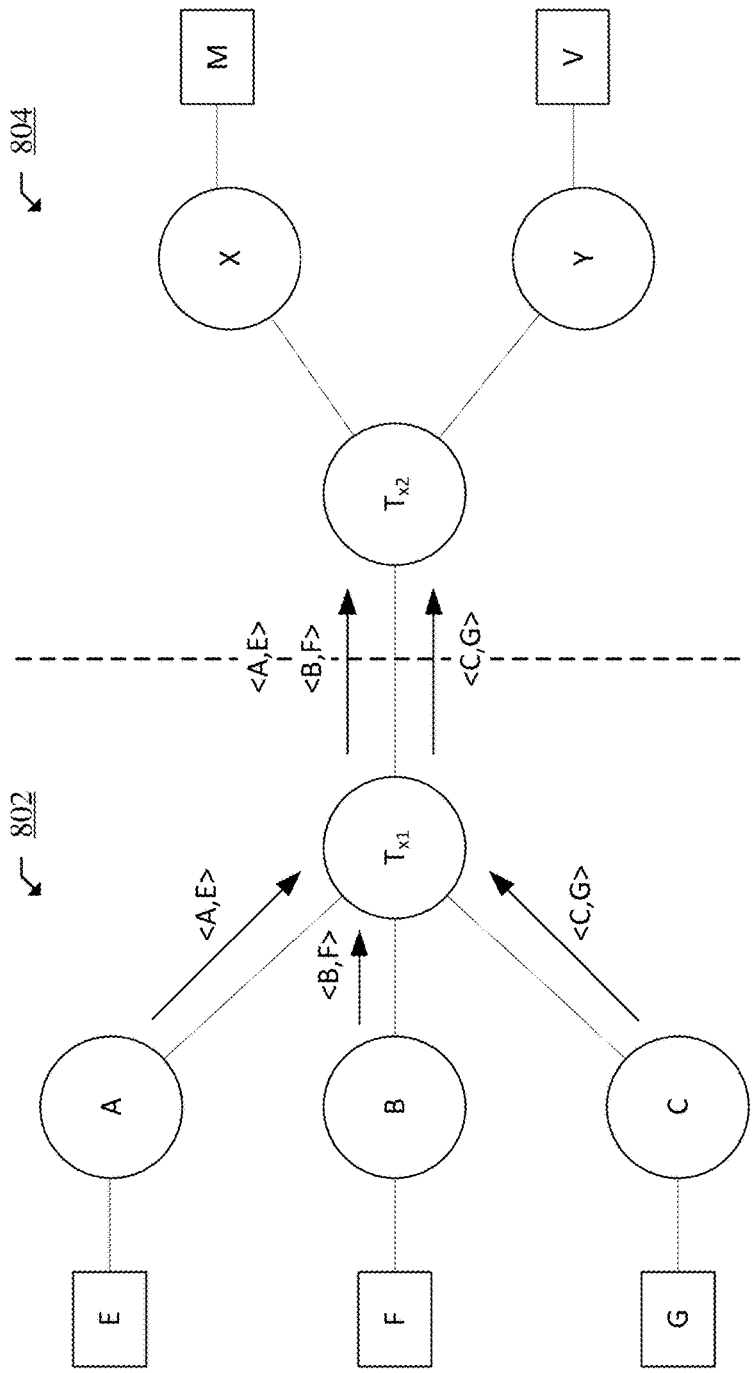
FIG. 8 shows another example network environment with multiple network domains for enforcing policy across the network domains.

FIG. 8 shows another example network environment 800 with multiple network domains for enforcing policy across the network domains. The network environment 800 includes a source network domain 802 and a destination network domain 804. Similar to the network environment 700 shown in FIG. 7, the source network domain 802 can be a source of network traffic and routes for network traffic in the network environment 800 and the destination network domain 804 can be a destination of network traffic and routes for network traffic in the network environment 800. In various embodiments, the source network domain 802 can act as a destination of network traffic and routes for network traffic and therefore act as a destination network domain. However, for the purposes of this discussion, the source network domain 802 is referred to and functions as a source network domain. Further, the destination network domain 804 can act as a source of network traffic and routes for network traffic and therefore act as a source network domain. However, for the purposes of this discussion, the destination network domain 804 is referred to and functions as a destination network domain.

In the example network environment 800 shown in FIG. 8, the source network domain 802 a SDN datacenter domain. Further, in the example network environment 800 shown in FIG. 8, the destination network domain 804 can be a SDWAN domain. In being implemented as a SDWAN domain, the destination network domain 804 can use an applicable SDWAN protocol for controlling network traffic within the destination network domain 804. For example, the destination network domain 804 can use the Locator ID Separation Protocol (LISP) to control network traffic. While LISP is described with reference to FIG. 8, the destination network domain 804 can use applicable demand-based control planes and/or pull-based control planes to control network traffic.

The source network domain 802 includes transit VRF $T_{x1}$ coupled to VRFs A, B and C. The source network domain 802 also includes nodes E, F, and G coupled to corresponding VRFs A, B, and C. Nodes E, F, and G can be an applicable type of node based on a network domain type of the source network domain 802. For example, the host/nodes within the IP prefixes/subnets E, G, and G can be endpoints associated with one or more EPGs.

The destination network domain 804 includes transit VRF $T_{x2}$ coupled to VRFs X and Y. The destination network domain 804 also includes nodes M and V coupled to corresponding VRFs X and Y. Nodes M and V can be an applicable type of node based on a network domain type of the destination network domain 804. For example, the hosts/nodes within the IP prefixes/subnets M and V can be endpoints associated with one or more SGTs.

Transit VRF $T_{x2}$ and transit VRF $T_{x1}$ function to transmit data between each other across the network domains 802 and 804. Specifically, transit VRF $T_{x2}$ and transit VRF $T_{x1}$, similar as to the transit VRFs in the example network environment 700 shown in FIG. 7, can exchange route advertisements for purposes of enforcing cross-domain policy across the source network domain 802 and the destination network domain 804. More specifically, transit VRF $T_{x2}$ can transmit route advertisements for nodes E, F, and G to transit VRF $T_{x1}$. While reference is made to the use of route advertisements with respect to the network environment 800, as the destination network domain 804 uses a demand/pull protocol to control network traffic, the route advertisements discussed with respect to FIG. 8 are route advertisements per se. Specifically, the route advertisements can include identifiers of the corresponding VRFs A, B, and C coupled to the nodes E, F, and G and the prefixes/addresses associated with the nodes E, F, and G. For example, a route advertisement for node E can be <A,E> and include the identification of VRF A, a route advertisement for node F can be <B,F> and include the identification of VRF B, and a route advertisement for node G can be <C,G> and include the identification of VRF C.

Transit VRF $T_{x2}$ can export routes to nodes E, F, and G to the VRFs X and Y. The transit VRF $T_{x2}$ can export the routes to the VRFs X and Y by filtering the route advertisements <A,E>, <B,F>, and <C,G> received from the source network domain 802, e.g. through transit VRF $T_{x1}$. Specifically, the transit VRF $T_{x2}$ can export routes to only the nodes E, F, and G and not the VRFs A, B, and C, thereby enforcing reachability policy as part of the cross-domain policy for the network environment 800.

As the destination network domain 804 uses LISP, transit VRF $T_{x2}$ can use a lookup, e.g. an expanded Extranet lookup, for the destination network domain 804 to filter the route advertisements and selectively export the routes to VRFs X and Y. Specifically, after receiving the route advertisements from transit VRF $T_{x1}$, transit VRF $T_{x2}$ can register all EIDs of the nodes in the route advertisements, e.g. register all EIDs as part of a policy for the destination network domain 804. For example, the transit VRF $T_{x2}$ can register the addresses/prefixes of nodes E, F, and G that are included as part of the route advertisements <A,E>, <B,F>, and <C,G>. In registering the EIDs of the nodes in the route advertisements, transit VRF $T_{x2}$ can also register the identifiers of the corresponding VRFs included in the route advertisements. For example, transit VRF $T_{x2}$ can register an identifier of VRF A with the EID of node E, an identifier of VRF B with the EID of node F, and an identifier of VRF C with the EID of node G.

Accordingly, as part of filtering the route advertisements to export the routes, transit VRF $T_{x2}$ can use the EIDs of the nodes and the identifiers of the VRFs associated with the nodes to determine whether to allow or deny mappings between nodes in both the source network domain 802 and the destination network domain 804. Specifically, transit VRF $T_{x2}$ can use the EIDs and the identifiers of the VRFs to determine whether to allow or deny a mapping between nodes in the destination network domain and nodes in the source network domain 802 according to a cross-domain policy, based on an identification of VRFs coupled to the nodes in the source network domain 802. For example, the VRF $T_{x2}$ can determine whether to allow a traffic mapping between node M in the destination network domain 804 and node E in the source network domain 802 based on an identification of VRF A coupled to node E in the source network domain 802. A traffic mapping, as used herein, is a mapping between a node in the source network domain 802 and a node in the destination network domain 804 that allows for passing of traffic from the node in the source network domain 802 to the node in the destination network domain 804.

In using an identification of a VRF in the source network domain 802 to determine whether to allow a traffic mapping between a node in the source network domain 802 and a node in the destination network domain 804, transit VRF $T_{x2}$ can look up an EID of the node in the source network domain 802, e.g. the node acting as a destination node, in an Extranet policy. For example, in determining whether to map node E to node M, the transit VRF $T_{x2}$ can look up the EID of node E <E> in an Extranet policy. If the node/EID is found in the Extranet policy, then transit VRF $T_{x2}$ can obtain the identifier of the VRF coupled to the node in the source network domain 802. For example, transit VRF $T_{x2}$ can obtain the identifier of VRF A associated with node E using the route advertisement <A,E> or a recorded entry of the route advertisement in the Extranet policy, e.g. created as part of registering node E.

As follows, transit VRF $T_{x2}$ can then determine whether the cross-domain policy allows a VRF of the node in the destination network domain 804, e.g. the VRF acting as a source VRF, to reach the node in the source network domain 802, e.g. the node acting as the destination node. Specifically, transit VRF $T_{x2}$ can determine whether the cross-domain policy allows the VRF acting as the source node in the destination network domain 804 to reach the node acting as the destination node in the source network domain 802, based on the identification of the VRF coupled to the node/destination node in the source network domain 802. For example, in determining whether to map node E to node M, transit VRF $T_{x2}$ can determine whether VRF X, acting as a source node, can reach node E, acting as a destination node, according to the cross-domain policy. Specifically, transit VRF $T_{x2}$ can determine whether the cross-domain policy allows VRF X to communicate with VRF A coupled to node E based on the obtained identification of VRF A coupled to node E. Accordingly, if the cross-domain policy allows VRF X to communicate with VRF A, then transit VRF $T_{x2}$ can generate a mapping between node E and M, effectively filtering the route advertisement <A,E> to export route <E> to node M. Alternatively, if the cross-domain policy does not allow VRF X to communicate with VRF A, then transit VRF $T_{x2}$ can deny a mapping between node E and M, effectively filtering the route advertisement <A,E> to not export route <E> to node M.

The technique of filtering route advertisements in a network that uses LISP is further shown in the following example scenario and pseudo-code to illustrate the example scenario. Specifically, a cross-domain policy for the network environment 800 can specify that VRFs A and B should not be able to reach VRF Y, while VRF C should not be able to reach X. Specifically, the pseudo-code can specify:

Extranet Policy: $Tx_2$=Extranet VN→X & Y=Subscriber VNs
Cross-domain VN Policy: (whitelist logic, i.e., A & B should not be able to reach Y, and C should not be able to reach X)
Compound Policy:

Accordingly, when determining whether to allow communication between node M, coupled to VRF X, and nodes E, F, and G, VRF X is the source VRF/VN. As VRFs A and B can reach VRF X according to the cross-domain policy, if the destination EID is nodes E and F, corresponding to VRFs A and B, then the destination EID should be mapped to the corresponding node, node M, to the source VRF, VRF X. Specifically, nodes E and F should be mapped to node M, as the cross-domain policy allows for communication between VRFs A and B and VRF X. Conversely, as VRF C cannot reach VRF X according to the cross-domain policy, if the destination EID is node G, corresponding to VRF C, then the destination EID should not be mapped to the corresponding node of the source VRF. Specifically, node G should not be mapped to node M, as the cross-domain policy does not allow for communication between VRF C and VRF X.

Case (Src_VN)
Src_VN=X
 If (Dest_VN=(X or $Tx_2$)) & (ED_Color/VRF identifier=A or Color/VRF identifier=B)→Map-reply
  Else>Negative Map-reply Similarly, when determining whether to allow communication between node V, coupled to VRF Y, and nodes E, F, and G, VRF Y is the source VRF/VN. As VRF C can reach VRF Y according to the cross-domain policy, if the destination EID is node G, corresponding to VRF C, then the destination EID should be mapped to the corresponding node, node V, of the source VRF, VRF Y. Specifically, node G should be mapped to node V, as the cross-domain policy allows for communication between VRF C and VRF Y. Conversely, as VRFs A and B cannot reach VRF Y according to the cross-domain policy, if the destination EID includes one of nodes E and F, corresponding to VRFs A and B, then the destination EID should not be mapped to the corresponding node of the source VRF. Specifically, nodes E and F should not be mapped to node V, as the cross-domain policy does not allow for communication between VRFs A and B and VRF Y.

Figure 9:
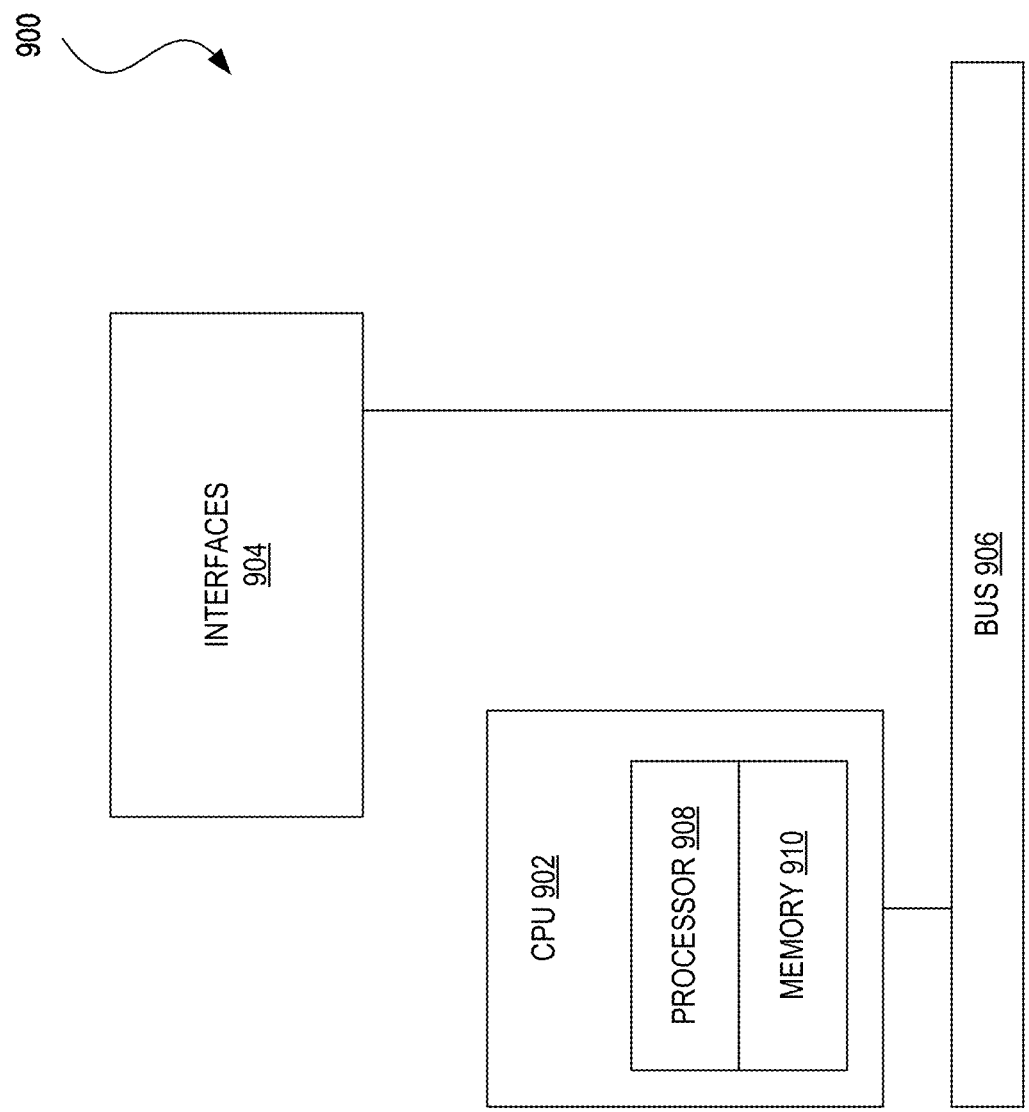
FIG. 9 illustrates an example of a network device.

Src_VN=Y
 If (Dest_VN=(Y or $Tx_1$)) & (EID_Color=C)→Map-reply
  Else→Negative Map-reply FIG. 9 illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10:
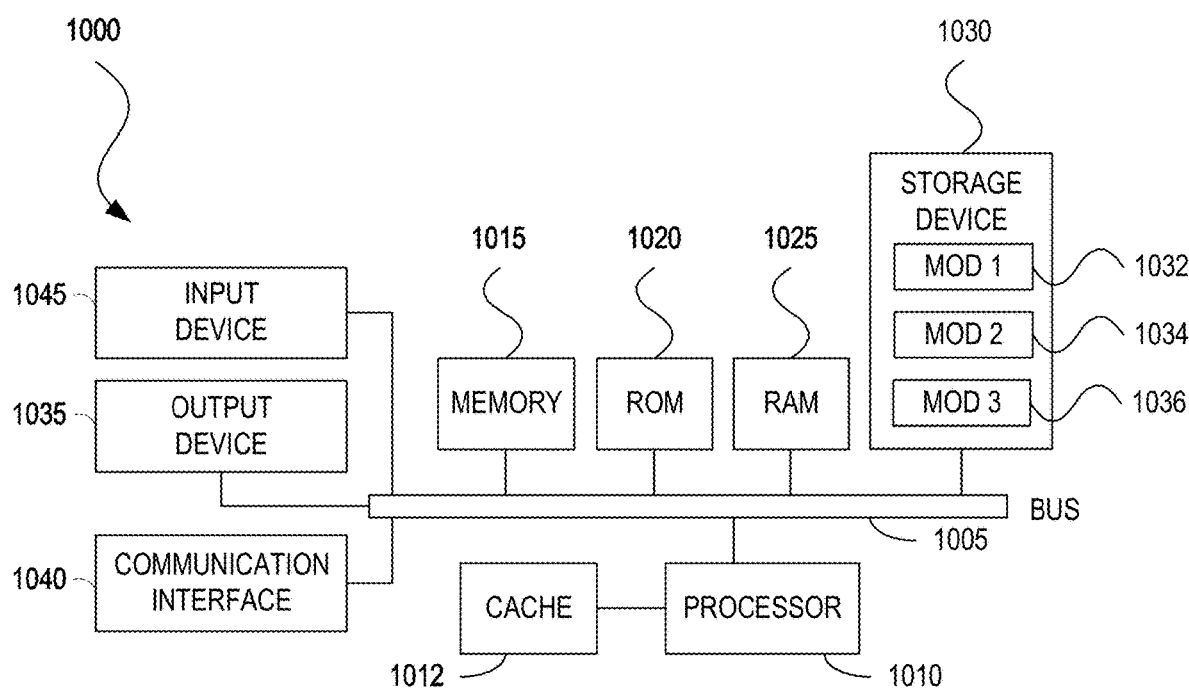
FIG. 10 illustrates an example of a bus computing system wherein the components of the system are in electrical communication with each other using a bus.

FIG. 10 illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    creating transit virtual routing and forwarding instances (VRFs) for a software-defined enterprise network domain and a software-defined networking (SDN) datacenter domain;
    generating, at a source transit VRF of the transit VRFs in a source network domain of one of the software-defined enterprise network domain and the SDN datacenter domain, a first route advertisement for a first route to a first node coupled to a first source VRF in the source network domain and a second route advertisement for a second route to a second node coupled to a second source VRF in the source network domain, wherein the first route advertisement includes an identification of the first source VRF and the second route advertisement includes an identification of the second source VRF;
    transmitting the first route advertisement and the second route advertisement to a destination transit VRF in a destination network domain of one of the software-defined enterprise network domain and the SDN datacenter domain;
    filtering, at the destination transit VRF, the first route advertisement and the second route advertisement based on a cross-domain policy using the identification of the first source VRF and the identification of the second source VRF to export the first route and the second route to one or more destination VRFs in the destination network domain according to the cross-domain policy;
    determining whether there is address overlap between the first route to the first node and the second route to the second node; and
    merging the first route advertisement and the second route advertisement into a combined route advertisement and transmitting the combined route advertisement from the source transit VRF to the destination transit VRF if it is determined that the first route and the second route lack address overlap.

2. The method of claim 1, wherein the source network domain is the software-defined enterprise network domain and the destination network domain is the SDN datacenter domain.

3. The method of claim 1, wherein the source network domain is the SDN datacenter domain and the destination network domain is the software-defined enterprise network domain.

4. The method of claim 1, further comprising:
    generating the second route advertisement at a second source transit VRF separate from the source transit VRF used to create the first route advertisement if it is determined that the first route and the second route have address overlap; and
    transmitting the second route advertisement to the destination network domain separate from the first route advertisement using the second source transit VRF if it is determined that the first route and the second route have address overlap.

5. The method of claim 1, wherein filtering the first route advertisement and the second route advertisement at the destination transit VRF further comprises:
    filtering a route to only the first source VRF from the first route advertisement to export only the first route to the first node coupled to the first source VRF from the first route advertisement to the one or more destination VRFs; and
    filtering a route to only the second source VRF from the second route advertisement to export only the second route to the second node coupled to the second source VRF from the second route advertisement to the one or more destination VRFs.

6. The method of claim 5, wherein an absence of the route to only the first source VRF and the route to only the second source VRF at the one or more destination VRFs enforces reachability policy between one or more nodes in the destination network domain and the first node and the second node in the source network domain.

7. The method of claim 1, wherein the destination transit VRF is configured to operate according to the source transit VRF by:
    generating route advertisements for routes of nodes coupled to the one or more destination VRFs in the destination network domain, wherein the route advertisements include identifications of the one or more destination VRFs; and
    transmit the route advertisements to the source transit VRF for exporting the routes to the first node and the second node in the source network domain through filtering of the route advertisements based on the cross-domain policy using the identifications of the one or more destination VRFs.

8. The method of claim 1, wherein the first route advertisement includes an endpoint identifier address of the first node in the source network domain and the second route advertisement includes an endpoint identifier address of the second node in the source network domain and the destination transit VRF is configured to utilize the endpoint identifier address of the first node and the endpoint identifier address of the second node to export the first route and the second route to the one or more destination VRFs in the destination network domain.

9. The method of claim 1, further comprising importing the first route and the second route at the source transit VRF and associating the identification of the first source VRF with the first route and the identification of the second source VRF with the second route.

10. The method of claim 1, wherein filtering the first route advertisement at the destination transit VRF further comprises:

registering an endpoint identifier address of the first node and the identification of the first source VRF in a policy of the destination network domain; and determining whether to allow or deny traffic mappings between one or more nodes coupled to the one or more destination VRFs in the destination network domain and the first node according to the cross-domain policy using the identification of the first source VRF.

11. The method of claim 10, further comprising:

determining whether the cross-domain policy allows the one or more destination VRFs acting as source VRFs in the destination network domain to reach the first node acting as a destination node in the source network domain based on the identification of the first source VRF coupled to the first node in the source network domain; and allowing the traffic mappings between the one or more nodes coupled to the one or more destination VRFs and the first node if it is determined that the cross-domain policy allows the one or more destination VRFs acting as the source VRFs in the destination network domain to reach the first node acting as the destination node in the source network domain.

12. The method of claim 11, further comprising denying the traffic mappings between the one or more nodes coupled to the one or more destination VRFs and the first node if it is determined that the cross-domain policy does not allow the one or more destination VRFs acting as the source VRFs in the destination network domain to reach the first node acting as the destination node in the source network domain.

13. The method of claim 10, wherein the destination network domain utilizes demand-based and/or pull-based control planes to control network traffic in the destination network domain according.

14. A system comprising:

one or more processors; and at least one computer-readable storage medium having stored therein instructions which, when executed by the one or more processors, cause the one or more processors to perform operations comprising:

creating transit virtual routing and forwarding instances (VRFs) for a software-defined enterprise network domain and a software-defined networking (SDN) datacenter domain;

generating, at a source transit VRF of the transit VRFs in a source network domain of one of the software-defined enterprise network domain and the SDN datacenter domain, a first route advertisement for a first route to a first node coupled to a first source VRF in the source network domain and a second route advertisement for a second route to a second node coupled to a second source VRF in the source network domain, wherein the first route advertisement includes an identification of the first source VRF and the second route advertisement includes an identification of the second source VRF;

transmitting the first route advertisement and the second route advertisement to a destination transit VRF in a destination network domain of one of the software-defined enterprise network domain and the SDN datacenter domain, wherein the destination transit VRF is configured to filter the first route advertisement and the second route advertisement based on a cross-domain policy using the identification of the first source VRF and the identification of the second source VRF to export the first route and the second route to one or more destination VRFs in the destination network domain according to the cross-domain policy;

determining whether there is address overlap between the first route to the first node and the second route to the second node; and merging the first route advertisement and the second route advertisement into a combined route advertisement and transmitting the combined route advertisement from the source transit VRF to the destination transit VRF if it is determined that the first route and the second route lack address overlap.

15. The system of claim 14, wherein the instructions which, when executed by the one or more processors, further cause the one or more processors to perform operations comprising:

determining whether there is address overlap between the first route to the first node and the second route to the second node; and merging the first route advertisement and the second route advertisement into a combined route advertisement and transmitting the combined route advertisement from the source transit VRF to the destination transit VRF if it is determined that the first route and the second route lack address overlap.

16. The system of claim 15, wherein the instructions which, when executed by the one or more processors, further cause the one or more processors to perform operations comprising:

generating the second route advertisement at a second source transit VRF separate from the source transit VRF used to create the first route advertisement if it is determined that the first route and the second route have address overlap; and transmitting the second route advertisement to the destination network domain separate from the first route advertisement using the second source transit VRF if it is determined that the first route and the second route have address overlap.

17. The system of claim 14, wherein the instructions which, when executed by the one or more processors, further cause the one or more processors to perform operations comprising:

registering an endpoint identifier address of the first node and the identification of the first source VRF in a policy of the destination network domain; and determining whether to allow or deny traffic mappings between one or more nodes coupled to the one or more destination VRFs in the destination network domain and the first node according to the cross-domain policy using the identification of the first source VRF.

18. The system of claim 17, wherein the instructions which, when executed by the one or more processors, further cause the one or more processors to perform operations comprising:

determining whether the cross-domain policy allows the one or more destination VRFs acting as source VRFs in the destination network domain to reach the first node acting as a destination node in the source network domain based on the identification of the first source VRF coupled to the first node in the source network domain; and allowing the traffic mappings between the one or more nodes coupled to the one or more destination VRFs and the first node if it is determined that the cross-domain policy allows the one or more destination VRFs acting as the source VRFs in the destination network domain to reach the first node acting as the destination node in the source network domain.

19. A non-transitory computer-readable storage medium having stored therein instructions which, when executed by a processor, cause the processor to perform operations comprising:
creating transit virtual routing and forwarding instances (VRFs) for a software-defined enterprise network domain and a software-defined networking (SDN) datacenter domain;
generating, at a source transit VRF of the transit VRFs in a source network domain of one of the software-defined enterprise network domain and the SDN datacenter domain, a first route advertisement for a first route to a first node coupled to a first source VRF in the source network domain, wherein the first route advertisement includes an identification of the first source VRF;
transmitting the first route advertisement to a destination transit VRF in a destination network domain of one of the software-defined enterprise network domain and the SDN datacenter domain;
filtering, at the destination transit VRF, the first route advertisement based on a cross-domain policy using the identification of the first source VRF to selectively export the first route to one or more destination VRFs in the destination network domain according to the cross-domain policy;
determining whether there is address overlap between the first route to the first node and another route to a second node; and
merging the first route advertisement and the another route advertisement into a combined route advertisement and transmitting the combined route advertisement from the source transit VRF to the destination transit VRF if it is determined that the first route and the another route lack address overlap.

* * * * *

UNITED STATES PATENT AND TRADEMARK OFFICE
CERTIFICATE OF CORRECTION

| | | |
|---|---|---|
| PATENT NO. | : 10,826,775 B1 | Page 1 of 1 |
| APPLICATION NO. | : 16/446338 | |
| DATED | : November 3, 2020 | |
| INVENTOR(S) | : Victor Moreno et al. | |

It is certified that error appears in the above-identified patent and that said Letters Patent is hereby corrected as shown below:

In the Specification

At Column 6, Lines 66-67, 'In some embodiments, each edge network device 208 can form a Datagram Transport Layer Security (DTLS)' should be corrected to read --In some embodiments, each edge network device 142 can form a Datagram Transport Layer Security (DTLS)--

At Column 7, Lines 60-63, 'OMP routes can advertise attributes such as transport location (TLOC) information (which can similar to a BGP next-hop IP address)' should be corrected to read --OMP routes can advertise attributes such as transport location (TLOC) information (which can be similar to a BGP next-hop IP address)--

At Column 12, Lines 15-18, 'Controllers 516 can provide centralized access to fabric information, application configuration, resource configuration, application-level configuration modeling for a SDN infrastructure' should be corrected to read --Controllers 516 can provide centralized access to fabric information, application configuration, resource configuration, application-level configuration modeling for an SDN infrastructure--

Signed and Sealed this
Twenty-second Day of July, 2025

Coke Morgan Stewart
*Acting Director of the United States Patent and Trademark Office*